United States Patent [19]
Frank et al.

[11] Patent Number: 5,507,852
[45] Date of Patent: Apr. 16, 1996

[54] GLASS SHEET QUENCH

[75] Inventors: Robert G. Frank, Sarver; Michael T. Fecik, Pittsburgh; DeWitt W. Lampman, Gibsonia, all of Pa.

[73] Assignee: PPG Industries, Inc., Pittsburgh, Pa.

[21] Appl. No.: 178,977

[22] Filed: Jan. 7, 1994

[51] Int. Cl.⁶ ................................. C03B 27/044
[52] U.S. Cl. ................................. 65/348; 65/351
[58] Field of Search .................. 65/27, 28, 104, 65/106, 165, 114, 348, 349, 351

[56] References Cited

U.S. PATENT DOCUMENTS

| | | | |
|---|---|---|---|
| 2,790,270 | 4/1957 | Freiberg | 65/348 |
| 3,024,572 | 3/1962 | Richardson | 65/348 |
| 3,799,752 | 3/1974 | Cheron | 65/104 |
| 4,138,241 | 2/1979 | McKelvey | 65/114 |
| 4,140,511 | 2/1979 | Imler | 65/104 |
| 4,233,048 | 11/1980 | Ginert | 65/114 |
| 4,285,715 | 8/1981 | Frank | 65/106 |
| 4,444,579 | 4/1984 | Dunn et al. | 65/114 |
| 4,830,650 | 5/1989 | Kelly | 65/106 |

Primary Examiner—David L. Lacey
Assistant Examiner—Steven P. Griffin
Attorney, Agent, or Firm—Andrew C. Siminerio

[57] ABSTRACT

The present invention provides a quench for cooling hot sheet material. The quench includes a plurality of generally horizontally extending, spaced apart nozzle assemblies, each having a longitudinally extending air supply conduit with orifices extending to an outer surface of the conduit. A first plenum is interconnected to a first end of each of the conduits and a second plenum is interconnected to a second end of each of the conduits to allow cooling fluid to pass from the plenums into each of the nozzle assemblies through the conduit. The plenums are located at positions spaced laterally outward from the nozzle assemblies.

6 Claims, 4 Drawing Sheets

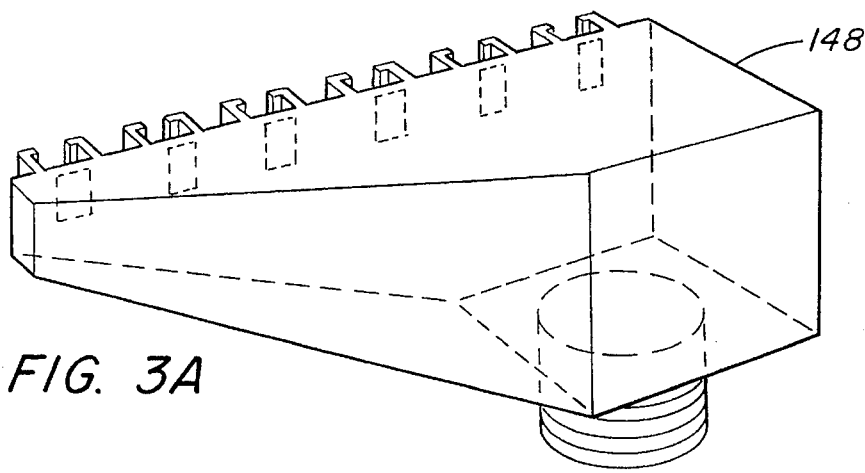
FIG. 3A
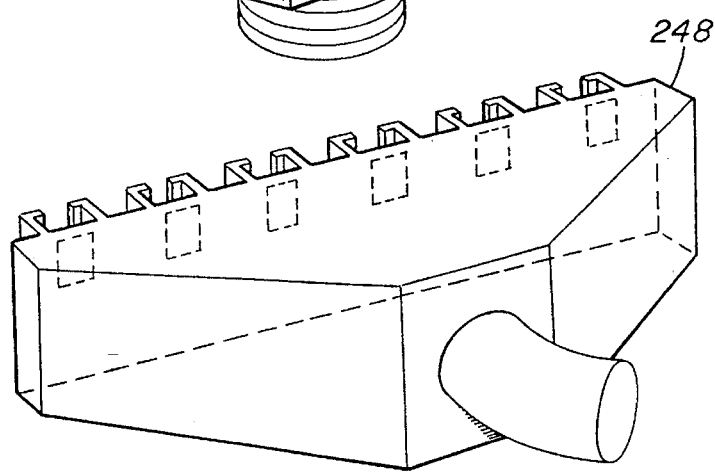
FIG. 3B
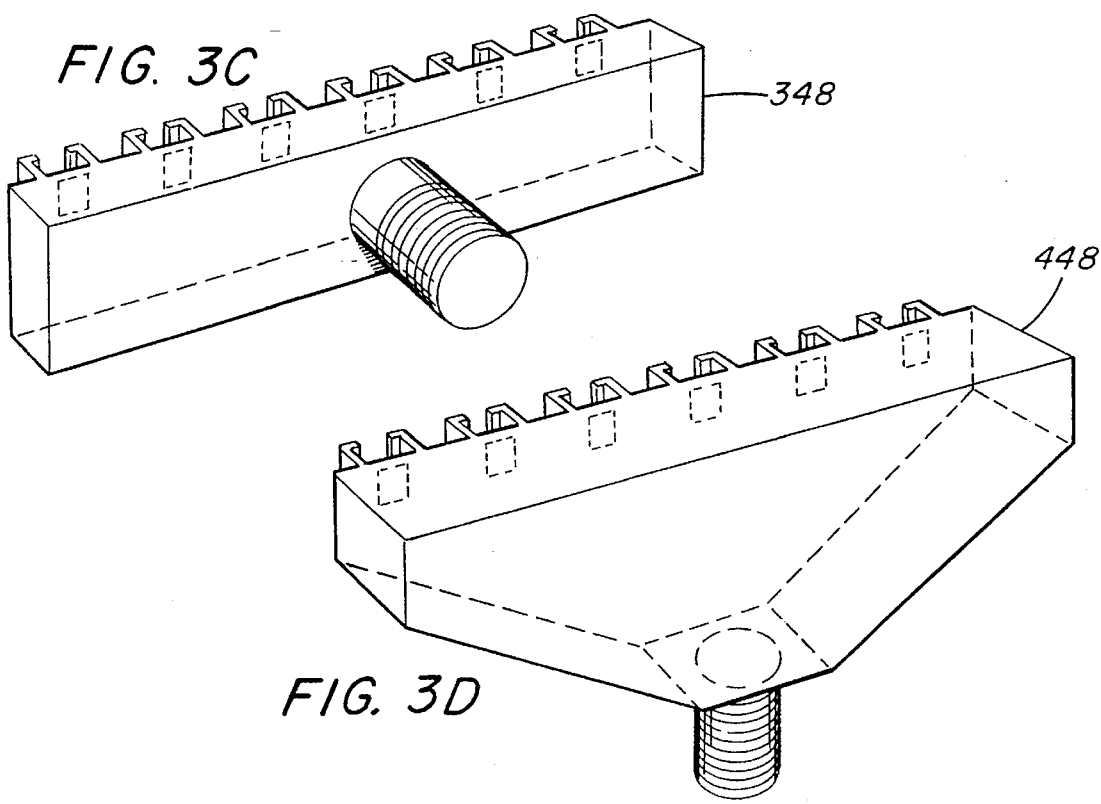
FIG. 3C
FIG. 3D

GLASS SHEET QUENCH

BACKGROUND OF THE INVENTION

The present invention relates to a quench arrangement for tempering hot shaped glass sheets and in particular to a quench arrangement that allows hot glass sheets to bypass a cooling station without upsetting the continuous flow of glass sheets through a glass sheet processing line.

In one method of shaping a glass sheet to a contoured configuration, the sheet is heated and engaged by an upper mold having the desired shape of the glass. The shaping may be supplemented by a complimenting lower mold that lifts and presses the glass sheet against the upper mold. After shaping, the glass sheet is transferred to a cooling station where the glass is rapidly quenched, i.e. tempered, by applying air blasts against the opposing major surfaces of the sheet. This transfer of the glass may be accomplished by depositing the shaped sheet onto a contoured support ring of a type well known in the art that moves between the shaping station and the cooling station.

In processing a series of glass sheets, problems may arise that adversely affect the operation of the entire line. More specifically, problems such as broken glass sheets or non-functioning shaping molds must be dealt with immediately because of the continuous flow of heat softened glass sheets through the system. If the glass sheet flow is slowed or stopped, glass sheets in the furnace may overheat and sag between or stick to the furnace conveyor rolls. As an alternative, the cooling station may be positioned alongside the shaping station rather aligned along the centerline of the furnace and shaping station so that the glass sheet may pass directly through the shaping station and into a collection bin. However, in some situations the cooling station is preferably linearly aligned with the glass sheet heating furnace and shaping station. More particularly, aligning the cooling station with the furnace and shaping station allows the glass sheet to be shaped to travel with its short dimension oriented along the centerline of the furnace. This in turn allows for zone heating of the glass sheet across its width. In addition, orienting the sheet in the short direction reduces the time required for the sheet to pass from the furnace into the shaping station and from the shaping station into the cooling station. With this type of heating/shaping/cooling arrangement, if the glass sheet is allowed to pass through the shaping station without being shaped and transferred onto a support ring, it would impact the quenches in the cooling station, resulting in broken glass which must be removed by an operator before the next glass sheet arrives. An operator may attempt to remove the hot glass sheet at the shaping station; however this provides a hazard to the operator because of the extremely high temperatures. In addition, if the glass sheet breaks in the shaping station, the glass fragments must be removed from the rolls and between the molds before the next glass sheet arrives.

It would be advantageous to provide a quench arrangement whereby glass may be unloaded from the line in the event of an operating problem without adversely affecting the serial flow of glass sheets through the line and without operator assistance.

SUMMARY OF THE INVENTION

The present invention provides a quench for cooling hot sheet material. The quench includes a plurality of generally horizontally extending, spaced apart nozzle assemblies, each having a longitudinally extending air supply conduit with orifices extending to an outer surface of said conduit. A first plenum is interconnected to a first end of each of the conduits and a second plenum is interconnected to a second end of each of the conduits to allow cooling fluid to pass from the plenums into each of the nozzle assemblies through the conduit. The plenums are located at positions spaced laterally outward from the nozzle assemblies. By moving the air supply to the nozzle assemblies from beneath the assemblies to adjacent the assemblies, escape of the cooling fluid supplied by the assemblies from the sheet being cooled is enhanced, providing more uniform distribution of the fluid along the sheet surface. In addition, glass sheets that fracture within the quench will fall between the nozzle assemblies and out of the quench so that the sheet processing may continue without any interruption.

BRIEF DESCRIPTION OF THE DRAWINGS

FIGS. 3(a–d) are views similar to FIG. 2 showing one of two air supply ducts for alternate quench arrangements.

DETAILED DESCRIPTION OF THE INVENTION

The present invention is illustrated in combination with a glass sheet heating, shaping and cooling arrangement but it should be appreciated that the teachings may be used in other arrangements and to cool other materials.

Figure 1:
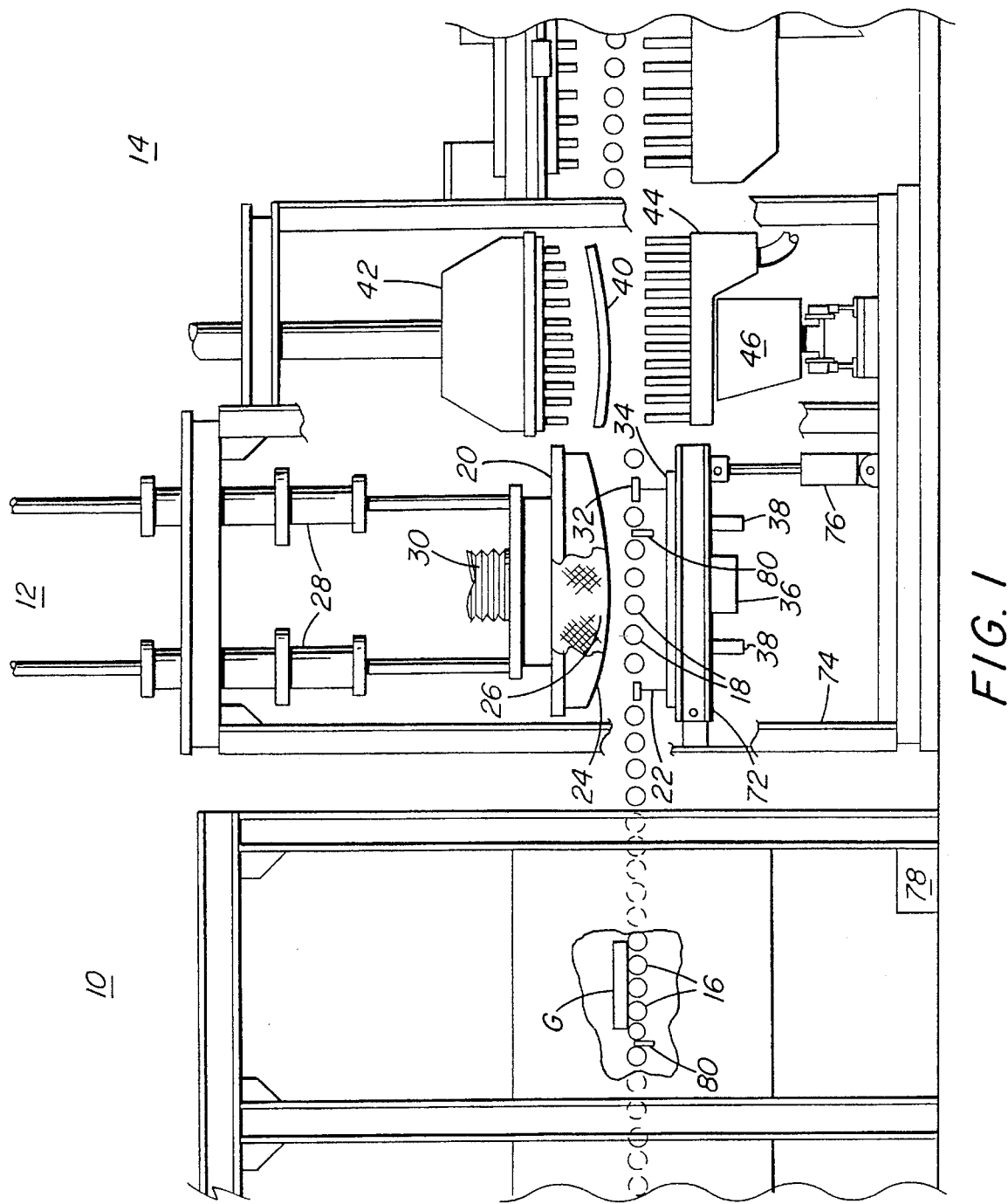
FIG. 1 is a schematic side elevation of a glass sheet heating, shaping and tempering line incorporating features of the present invention.

FIG. 1 illustrates a glass sheet heating, shaping and tempering layout including a furnace 1 0, shaping station 12 and cooling station 14. Glass sheets are conveyed over roll 16 through furnace 10 where they are heated to their heat softening temperature, typically between 1050° –1200° F. (566–649° C). Each sheet G is then conveyed by roll 18 to a shaping station 12 where it is positioned between a pair of opposing shaping surfaces and pressed to shape. In the particular embodiment illustrated in FIG. 1, shaping is performed by an upper vacuum mold 20 and a lower ring mold 22 as disclosed in U.S. Pat. No. 4,830,650 to Kelly. Upper mold 20 includes a metal or ceramic press face 24 and if required, a heat resistant fabric covering 26. Cylinders 28 are used to vertically align and reciprocate mold 20 relative to lower mold 22. Vacuum is drawn via duct 30 through mold 20 and along press face 24 to help conform the glass sheet to be shaped to the surface configuration of press face 24 and to hold the glass sheet G thereagainst. Lower ring mold 22 includes a peripheral pressing surface 32 which is supported from press plate 34. Drive 36 lifts and lowers plate 34 and ring mold 22 to lift the glass sheet G into contact with face 24 of the upper mold 20. Alignment rods 38 maintain vertical alignment of ring mold 22 with mold 20. After the glass sheet G is pressed to shape between the molds, it is deposited onto a support ring 40 and transferred to the cooling station 14 where the sheet G is contacted by high velocity air streams between upper quench 42 and lower quench 44, which is the subject of the present invention, to temper the sheet.

As an alternative to using a vacuum mold 20 to shape the glass sheet G, mold 20 may be replaced with a flat vacuum pickup (not shown) which lifts the glass sheet and drops it onto a shaping ring, a process commonly known by those skilled in the art as drop forming.

Typically, each glass sheet G is conveyed along a first generally horizontal plane on rolls 16 through furnace 10 and on rolls 18 into shaping station 12 in a direction which is generally aligned with the direction of movement of the shaped glass sheet along a second generally horizontal plane through cooling station 14. During shaping, the glass sheet G is shaped against upper mold 20 and held against press face 24 by vacuum. Thereafter, mold 20 moves upward to allow ring 40 to move from the cooling station 14 to a position beneath upper mold 20. When vacuum is terminated in mold 20, the shaped glass sheet G is dropped onto ring 40 which moves the sheet G into cooling station 14. With this arrangement, in the event of a malfunction, e.g. misalignment of the glass or non-operation of the mold 20 and/or ring 40, if the glass sheet continues on or is redeposited onto rolls 18, the sheet would continue through shaping station 12 and run into the quenches in the cooling station 14. However, lower quench 44, which is the object of the present invention, is configured so that the glass sheets G may run out through station 12 on rolls 18 and into a collector to collect the glass. In this manner, broken, misaligned or otherwise defective glass sheets may be removed from the furnace without any disruption of the continuous glass sheet heating, shaping and cooling operation. In addition, in the event the molds malfunction, the glass sheet may be easily removed from the shaping station.

Figure 4:
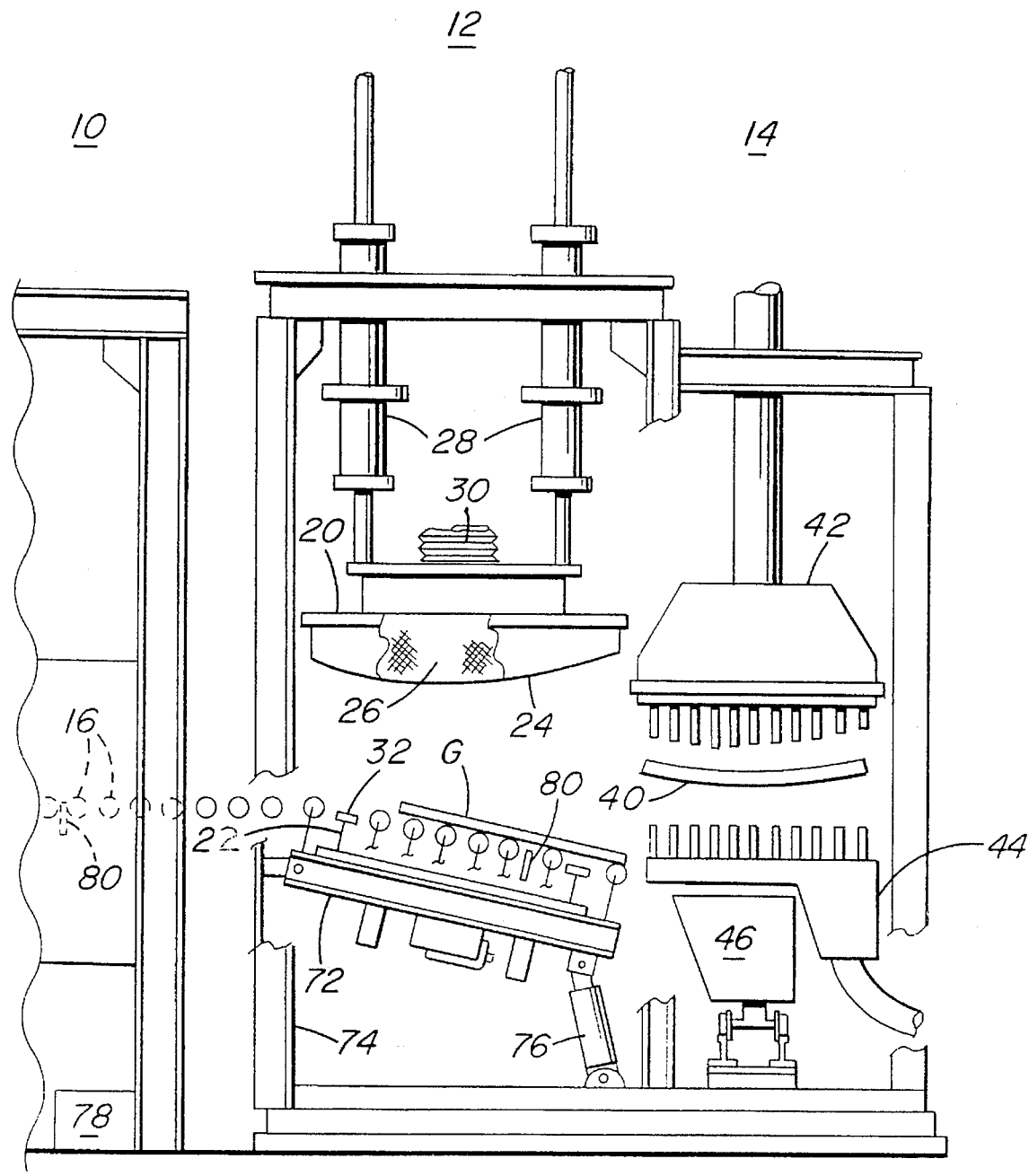
FIG. 4 is a side elevation of the pivoting support frame illustrated in a lowered, or dump, position.

In the particular embodiment of the invention shown in FIGS. 1 and 4, the collector is a removable hopper 46. It should be appreciated that the glass collector could also be any other type of arrangement which collects and removes the glass sheets from the cooling station 14. For example, a chute arrangement (not shown) may be positioned below the quench 44 to receive the discharged glass sheets and direct them into a bin or conveyor system located on a floor below the heating, shaping and cooling equipment.

Figure 2:
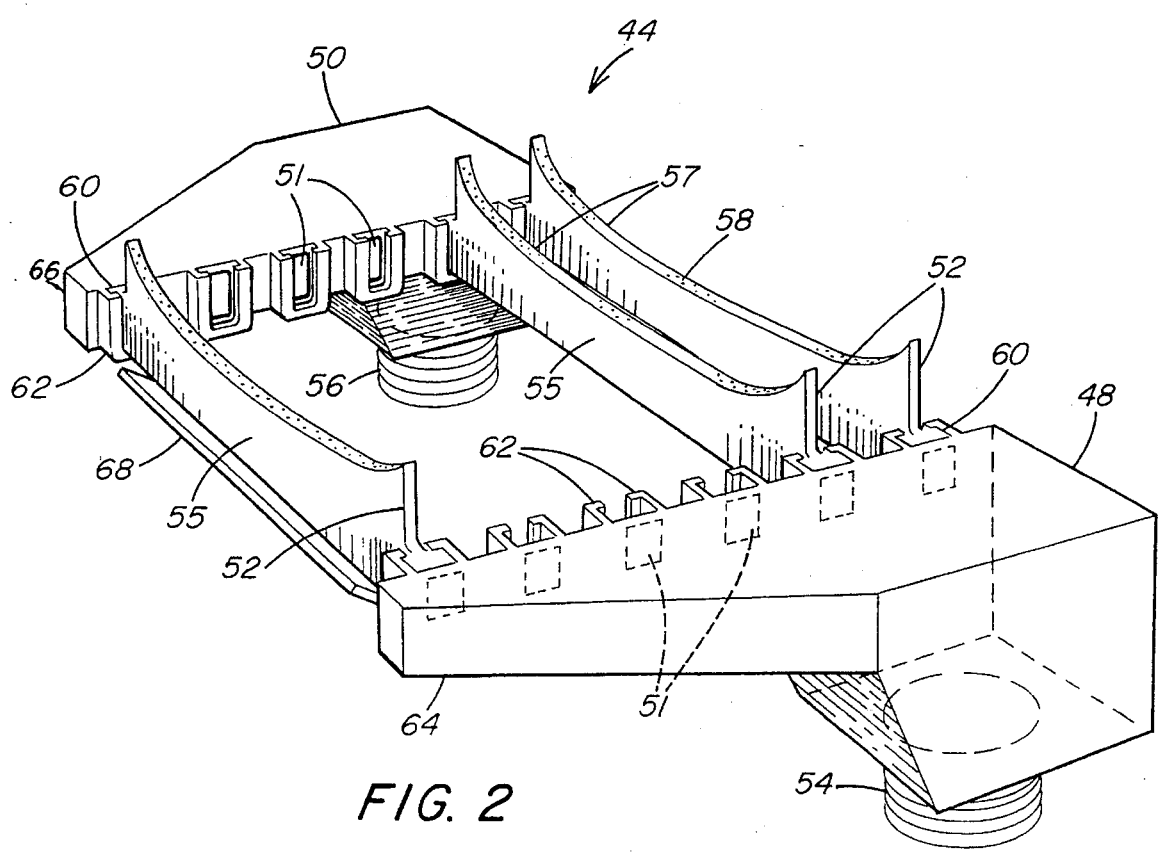
FIG. 2 is perspective view of a lower glass sheet quenching arrangement incorporating features of the present invention, with portions removed for clarity.

More particularly, unlike a typical quench arrangement which includes a plurality of nozzle bars fed by a common plenum, referring to FIG. 2, quench 44 eliminates the common plenum beneath the nozzles by providing two chambers 48 and 50 which are positioned to supply air through openings 51 in chambers 48 and 50 to opposite ends of a plurality of longitudinally extending, spaced apart nozzle assemblies 52. Each of chambers 48 and 50 is positioned laterally outward from the nozzle assemblies 52 and connected to an air supply duct 54 or 56, respectively, which are positioned at an end of the chambers. Assemblies 52 include an air supply conduit 55 which extends between and is connected to chambers 48 and 50 and a nozzle bar 57 having holes extending from surface 58 of nozzle bar 57 to conduit 55 to provide a pathway for air from chambers 48 and 50 through openings 51 to the glass sheet G to be cooled. As an alternative, nozzle bars 57 may be replaced with a plurality of individual nozzles (not shown) extending from conduit 55 to direct air at the glass. Although not required in the present invention, surface 58 of each nozzle bar 57 adjacent a major surface of the glass sheet to be cooled is configured to have a curved shape that generally corresponds to the adjacent glass sheet surface.

With continued reference to FIG. 2, although not limiting in the present invention, the ends of assemblies 52 are provided with a flanged section 60 which is slidably received by mating collars 62 at openings 51 in chambers 48 and 50. This arrangement allows quick removal and replacement of the assemblies 52.

In the particular embodiment illustrated in FIG. 2, chambers 48 and 50 have a tapered profile, at least in plan, with a minimum cross sectional profile at their upstream ends 64 and 66, respectively. The depth of the upstream portions 64 and 66 of chambers 48 and 50 is kept constant and at a minimum to facilitate the placement and removal of the hopper 46. The tapered shape of the chambers 48 and 50 of the quench 44 provides uniform flow of air from supply ducts 54 and 56 to each nozzle assembly 52 so that each assembly 52 delivers approximately the same volume of air at the same velocity as adjacent assemblies 52 to provide a uniform temper to the glass sheet G being cooled. In addition, supplying air to both ends of assemblies 52 provides uniform flow across the assemblies 52. It is expected that the combination of tapered chambers and the end air supply will provide uniform temper to the glass sheet G being cooled while reducing the overall size of the chambers 48 and 50.

If desired, a deflector plate 68, shown only in FIG. 2, may be positioned in front of the first nozzle assembly 52 on lower quench 44 closest to the shaping station 12 to further protect the quench from the hot glass sheets.

The elimination of the plenum from beneath the nozzle assemblies 52 by using chambers 48 and 50 provides additional advantages. First, since there is no structure beneath the glass sheet G to impede movement of the air supplied through the nozzle assemblies 52 of the lower quench 44, air escape is enhanced which in turn increases the uniformity of the temper. Second, the hopper 46 may now be positioned at the entry end of the cooling station 14 without any interference from the quenches. This allows the quench structure to be lowered and reduce the lift required by the upper mold 20 to lift the glass sheet G to the plane of the quench. Third, in the event that a glass sheet fractures while within this portion of the quench 14, the glass fragments will fall between the individual nozzle assemblies 52 so that they may be removed without interfering with the operation of the quench 14.

FIG. 3 and illustrate alternate embodiments of the present invention. As can be seen, the chambers 148, 248, 348 and 448 may assume a variety of shapes. More particularly, the chambers need not be tapered nor their depth be minimized and the air supply ducts may be connected to the chambers at a variety of locations. However it should be noted that in each of these alternate embodiments, there are two chambers feeding the nozzle assemblies from both ends to provide the required air flow across the nozzle assemblies. In addition, although the embodiments of the invention shown in FIGS. 2, 3(a), 3(b) and 3(d) show a uniform taper in portions of quench, these sections may be stepped or otherwise modified to get the desired air flow through the quench nozzles. It should further be appreciated that if desired, the nozzle assemblies may be oriented in a longitudinal direction rather than a transverse direction as shown in FIG. 2.

It should be appreciated that regardless of the actual quench design, air flow should be balanced between the upper and lower quenches to provide the required tempering characteristics and further so that the sheet G is not blown upward off the ring 40 by the nozzle assemblies 52 in lower quench 44 or blown downward into the ring 40 from the nozzle assemblies in an upper quench.

If desired, the design of lower quench 40 may also be used for the upper quench 42 or any other portion of the cooling station 14.

Referring to Figures 1 and 4, the lower ring mold 22, drive 36, alignment rods 38 and conveyor rolls 18 are all mounted on a pivoting frame 72. The frame 72 is pinned to a supporting structure 74 and cylinder 76 moves the frame 72 between an up, or run, position as shown in FIG. 1 wherein the glass is expected to be shaped by the upper mold 20 and lower ring 22, and a lower, or dump, position as shown in FIG. 4 wherein the glass runs off the rolls 18 and is dumped directly into a collector. This capability has particular utility when the operator knows in advance the glass sheets G are not going to be shaped. For example, in the event the furnace must be cleared of glass, the conveying rate of the glass through the furnace may be increased. However, since the glass will not be in the furnace long enough to reach its heat softening temperature, it will tend not to sag downward to the extent that it would if it was at a higher temperature. By lowering the frame 72 to its downward position, the operator can ensure that the glass will properly transfer through the shaping station 12 and be dumped into the collection hopper 46 without contacting any portion of the lower quench arrangement.

In the operation of the heating, shaping and cooling arrangement incorporating the quench design of the present invention, when there is unexpected failure in the system, e.g. the molds don't operate, the frame 72 remains in its up position as shown in FIG. 1 and the glass sheet G progresses through shaping station 12 and into hopper 46. Because the glass is at its heat softening temperature, the glass will sag once it is no longer supported by the rolls 18 and be deposited in the hopper 46. In the event that the operator knows in advance that the glass sheets are to be removed without shaping, the top press 20 may be retracted upward and frame 72 pivoted downward to its dump position to better transfer the glass sheets G from shaping station 12 into hopper 46. A controller 78 may be used in combination with a plurality of sensors 80 within the furnace 10 and shaping station 12 to monitor the movement and alignment of the glass sheet G through the furnace 10 and the operation of the mold 20 and ring 22 so that if it is required, frame 72 may be automatically lowered to its dump position. Controller 78 would also indicate the undesirable situation to the operator.

Other variations as are known to those of skill in the art may be resorted to without departing from the scope of the invention as defined by the claims that follow.

We claim:

1. A quench for cooling hot sheet material comprising:

a first discrete, stationary plenum having a first set of openings spaced along a side of said first plenum and a first set of mating collars, wherein each said mating collar of said first set of collars is located at an opening of said first set of openings;

a second discrete, stationary plenum spaced from said first plenum, said second plenum having a second set of openings spaced along a side of said second plenum which faces said side of said first plenum and a second set of mating collars, wherein each said mating collar of said second set of collars is located at an opening of said second set of openings and further wherein each opening of said second set of openings is generally aligned with a corresponding opening of said first set of openings along said first plenum;

a plurality of generally horizontally extending nozzle assemblies positioned between said first and second plenums, each of said nozzle assemblies having:

a longitudinally extending air supply conduit with orifices extending to an outer surface of said conduit, a first flanged section at a first end of each said nozzle assembly which is slidably received within one of said first mating collars of said first plenum such that said air supply conduit is aligned with one of said openings of said first set of openings, and a second flanged section at a second end of each said nozzle assembly which is slidably received within one of said second mating collars of said second plenum such that said air supply conduit is aligned with one of said openings of said second set of openings, wherein said first and second flanged sections and mating collars secure said nozzle assemblies to said first and second plenums such that cooling fluid may pass from said first and second plenums through said first and second sets of openings and into said air supply conduits of said nozzle assemblies.

2. The quench as in claim 1 wherein said first and second plenums are located at positions adjacent to and spaced from an area beneath said nozzle assemblies.

3. The quench as in claim 1 wherein said surface of said conduit is contoured to generally correspond to an adjacent major surface of a sheet to be cooled.

4. The quench as in claim 1 wherein each of said nozzle assemblies includes a nozzle bar and further wherein said orifices extend through said bar.

5. The quench as in claim 1 wherein said first and second plenums have a non-uniform vertical cross-section.

6. The quench as in claim 1 wherein said first and second plenums are tapered such that an upstream end of said first and second plenums has a depth less than a downstream portion.

\* \* \* \* \*

UNITED STATES PATENT AND TRADEMARK OFFICE
CERTIFICATE OF CORRECTION

PATENT NO. : 5,507,852
DATED : April 16, 1996
INVENTOR(S) : Frank et al.

It is certified that error appears in the above-indentified patent and that said Letters Patent is hereby corrected as shown below:

Claim 3, column 6, line 36, insert the word --outer-- before the word "surface".

Signed and Sealed this

Fifth Day of November, 1996

Attest:

BRUCE LEHMAN

Attesting Officer     Commissioner of Patents and Trademarks